United States Patent Office 3,074,890
Patented Jan. 22, 1963

---

3,074,890
STABLE SOLVENT COMPOSITION
George N. Grammer, Baton Rouge, La., assignor to Ethyl Corporation, New York, N.Y., a corporation of Delaware
No Drawing. Filed Oct. 27, 1958, Ser. No. 769,548
6 Claims. (Cl. 252—171)

This invention relates to chlorinated solvents, and particularly to a new and highly effective stabilized solvent composition particularly suitable for degreasing aluminum and other metal parts.

Chlorinated aliphatic hydrocarbons are used as solvents for the degreasing of metals, for dry cleaning and for many other purposes. Such solvents are useful in the degreasing of metals because of their low flammability and high solvency for oils and greases. Unfortunately, however, chlorinated aliphatic hydrocarbons in general attack and cause corrosion of metallic surfaces when they come into contact therewith. Such attacks, which also decompose the chlorinated aliphatic hydrocarbon, occur with surprising rapidity, especially at elevated temperatures.

Methyl chloroform, or 1,1,1-trichloroethane, is known to have exceptionally good solvency powers, particularly for metal cleaning operations. Further, this material is much less toxic than other chlorinated solvents. Very unfortunately, however, this particular solvent also exhibits an aggravated tendency to decompose and concurrently attack metals, both at ambient or storage conditions, and at elevated temperatures suitable for cleaning operations. The reason for this marked inadequacy of 1,1,1-trichloroethane is not understood. The weakness is thought to be because of the number of chlorine atoms attached to a single carbon atom within the molecular structure of 1,1,1-trichloroethane. But whatever the explanation, the above described deficiency has deterred commercial usage of the solvent. Accordingly, a significant need exists for a stable methyl chloroform composition, particularly a composition suitable for elevated temperature treatment of aluminum or similar easily corroded metals.

It is accordingly the object of this invention to provide a stabilized composition which is highly effective for the liquid degreasing of aluminum. A particular object is to provide 1,1,1-trichloroethane solvent system which retains chemical passivity during repeated cycles of exposure to aluminum metal at processing conditions, and against the degradation influences of moisture, temperature, aluminum halides, and light. Other objects will appear hereinafter.

The present invention is a solvent composition comprising 1,1,1-trichloroethane and minor and stabilizing amounts of diethylene glycol dimethyl ether dissolved therein. It is found that very low concentrations of diethylene glycol dimethyl ether, suitably 0.5 to 12 weight percent, added to the 1,1,1-trichloroethane solvent forms highly effective systems which resist deteriorating influences such as contact with aluminum metal, light, and elevated temperature. A preferred concentration range is from about 1 to 5 weight percent diethylene glycol dimethyl ether in 1,1,1-trichloroethane.

Stabilized compositions of the present invention show little or no tendency to attack aluminum metal, or alloys thereof, even at boiling conditions. The stabilized liquid can be stored for considerable periods of time, usually for months, in contact with aluminum and various metals, or alloys thereof, without significant decomposition.

The following examples demonstrate the effectiveness of stabilized 1,1,1-trichloroethane solvent even under the rigorous condition employed in some of the examples below. The chloride of aluminum used in the following examples particularly demonstrates the benefits derived from the invention since aluminum chloride reacts with 1,1,1-trichloroethane far more rapidly than do strips of aluminum metal. The salt also provides a catalyzing influence which increases the ordinary rate of decomposition of 1,1,1-trichloroethane in contact with aluminum metal.

In all instances below wherein the decomposition of the solvent and the metal was not clearly apparent by visual observation, the solvent was titrated against standardized sodium hydroxide to determine any increase in acidity, hydrochloric acid being a decomposition product of 1,1,1-trichloroethane. Also the metal strips were tared and reweighed at the termination of the demonstration. The first example demonstrates the advantages obtained by the use of stabilized 1,1,1-trichloroethane in contact with aluminum metal even under very rigorous conditions.

*Example I*

Ten milliliters of 1,1,1-trichloroethane and a sufficient quantity of diethylene glycol dimethyl ether to form a 3.7 percent weight concentration, was added to a glass flask. Next, 1 milliliter of a 0.0023 molar solution of hydrogen chloride in 1,1,1-trichloroethane and 0.05 gram of aluminum chloride was added to the flask. A strip of polished aluminum metal was then immersed in the solvent. The temperature of the solvent was then raised to 74° C. and the contents of the flask subjected to diffused light. These conditions were maintained for a period of 14 days. At the end of this time the contents of the flask were examined. There was not the slightest decomposition of the 1,1,1-trichloroethane. The strip of aluminum metal was also unattacked.

The following example demonstrates the benefits of the invention wherein an even lesser amount of diethylene glycol dimethyl ether was used to stabilize the 1,1,1-trichloroethane.

*Example II*

This example is the same as the foregoing example in all respects except that a 1.8 percent weight concentration of diethylene glycol dimethyl ether in 1,1,1-trichloroethane solvent was formed within the glass flask. At the end of 10 days there was again no decomposition of the 1,1,1-trichloroethane. The strip of aluminum metal was again unattacked.

In order to contrast the benefits derived from the use of stabilized 1,1,1-trichloroethane, unstabilized 1,1,1-trichloroethane was employed in the following example.

*Example III*

A strip of polished aluminum metal was immersed in 15 milliliters of pure, dry 1,1,1-trichloroethane within a glass flask. The contents of the flask were maintained at room temperature, approximately 25° C. Within 3 minutes a visible bubbling reaction began with discoloration of the 1,1,1-trichloroethane and deposition of carbonaceous material. At the end of 25 minutes the aluminum strip was withdrawn from the 1,1,1-trichloroethane solvent which was now opaque. The aluminum strip was badly corroded and portions thereof had been eaten away.

The following example describes a method of treating aluminum metal parts as in a commercial treating operation.

*Example IV*

Seventeen gallons of a 3 weight percent solution of diethylene glycol dimethyl ether in 1,1,1-trichloroethane was charged into an open vat formed from a thin stainless steel shell. The lower portion of the vat was lined with steam heating coils.

In operation, the stabilized 1,1,1-trichloroethane within the vat is heated to 74° C., and maintained at this temperature. Fabricated aluminum parts are immersed below the surface of the liquid. The oil, grease, dirt, metal chips, etc. are removed from the fabricated parts and remain behind within the liquid bath when the said parts are removed from the liquid body. The thoroughly clean parts are thereafter ready for further assembly.

It will be understood that certain minor modifications can be made in the above process without departing from the spirit and scope of the invention. Various stabilized solvent concentrations have been given in the foregoing specification. As stated heretofore, generally in the liquid degreasing of aluminum a concentration of at least about 0.5 weight percent of diethylene glycol dimethyl ether in 1,1,1-trichloroethane is preferred. Greater concentrations can be used quite successfully. By an "inhibiting amount" of diethylene glycol dimethyl ether is meant any amount or quantity thereof added to stabilize the 1,1,1-trichloroethane against decomposition.

Having described the invention what is claimed is:

1. 1,1,1-trichloroethane containing diethylene glycol dimethyl ether present in an amount sufficient to stabilize the 1,1,1-trichloroethane against decomposition when in contact with aluminum.

2. In a degreasing process wherein 1,1,1-trichloroethane is contacted with aluminum metal, the improvement comprising maintaining diethylene glycol dimethyl ether dissolved in the 1,1,1-trichloroethane in an amount sufficient to stabilize the 1,1,1-trichloroethane against decomposition.

3. The composition of claim 1 wherein the amount of diethylene glycol dimethyl ether is from about 0.5 to about 12 weight percent.

4. The composition of claim 1 wherein the amount of diethylene glycol dimethyl ether is from about 1 to about 5 weight percent.

5. The process of claim 2 wherein the amount of diethylene glycol dimethyl ether is from about 0.5 to about 12 weight percent.

6. The process of claim 2 wherein the amount of diethylene glycol dimethyl ether is from about 1 to about 5 weight percent.

References Cited in the file of this patent

UNITED STATES PATENTS

| | | |
|---|---|---|
| 2,088,085 | Gross et al. | July 27, 1937 |
| 2,355,319 | Morris et al. | Aug. 8, 1944 |
| 2,371,645 | Aitchison et al. | Mar. 20, 1945 |
| 2,838,458 | Bachtel | June 10, 1958 |
| 2,870,094 | Cathcart | Jan. 20, 1959 |

FOREIGN PATENTS

| | | |
|---|---|---|
| 765,522 | Great Britain | Jan. 9, 1957 |